ð(12) United States Patent
Haynes et al.

(10) Patent No.: US 8,192,792 B2
(45) Date of Patent: Jun. 5, 2012

(54) COLD SPRAYED POROUS METAL SEALS

(75) Inventors: Jeffrey D. Haynes, Stuart, FL (US);
Andrew DeBiccari, North Branford, CT (US); Gary Shubert, East Hampton, CT (US)

(73) Assignee: United Technologies Corporation, Hartford, CT (US)

( * ) Notice: Subject to any disclaimer, the term of this patent is extended or adjusted under 35 U.S.C. 154(b) by 1532 days.

(21) Appl. No.: 11/588,953

(22) Filed: Oct. 27, 2006

(65) Prior Publication Data

US 2008/0102220 A1    May 1, 2008

(51) Int. Cl.
 *B05D 1/12* (2006.01)
(52) U.S. Cl. ........ 427/180; 427/446; 427/448; 427/455; 427/191; 427/192; 427/197; 427/422
(58) Field of Classification Search .................... 427/448
See application file for complete search history.

(56) References Cited

U.S. PATENT DOCUMENTS

| 4,023,252 | A | * | 5/1977 | Levinstein et al. | 428/650 |
| 5,951,892 | A | * | 9/1999 | Wolfla et al. | 219/121.69 |
| 6,365,222 | B1 | * | 4/2002 | Wagner et al. | 427/140 |
| 7,153,567 | B1 | | 12/2006 | Akedo et al. | |
| 7,163,370 | B2 | | 1/2007 | Kokusho | |
| 2006/0207094 | A1 | * | 9/2006 | Allen et al. | 29/889.1 |
| 2006/0216428 | A1 | | 9/2006 | DeBiccari et al. | |

FOREIGN PATENT DOCUMENTS

| EP | 1 398 394 A | | 3/2004 |
| EP | 1 672 175 A | | 6/2006 |
| GB | 2 394 479 A | * | 4/2004 |
| JP | 2004225632 A | | 8/2004 |
| JP | 2004256920 A | | 9/2004 |
| JP | 2006265732 A | | 10/2006 |

OTHER PUBLICATIONS

European Search Report for EP 07254218.6-2122, Dated Mar. 6, 2008.

\* cited by examiner

*Primary Examiner* — Katherine A Bareford
(74) *Attorney, Agent, or Firm* — Bachman & LaPointe, P.C.

(57) ABSTRACT

Methods are described for applying abradable material onto a seal backing material to form an abradable seal between rotating and stationary components of turbines using cold spray deposition technology to control the density, porosity and thickness of the sealing layer.

27 Claims, 4 Drawing Sheets

Ti 6-4

Inconel 625

Inco 718

COLD SPRAYED POROUS METAL SEALS

BACKGROUND OF THE INVENTION

The invention relates generally to the field of advanced static seals. More specifically, the invention relates to methods for depositing abradable material onto a seal backing material to form air seals that reduce clearances between rotating and stationary parts in turbines.

Improving sealing between rotating and stationary parts in turbines can significantly reduce parasitic leakages thereby improving performance. Abradable seals are one type of seal incorporated into turbines that reduce blade tip clearances.

Abradable seals have been in use in aviation gas turbines since the late 1960's and early 1970's. Abradable seals are a relatively simple means to reduce gas path clearances in both compressors and turbines. The seals offer clearance reductions at relatively low cost.

FIG. 1 shows where abradable materials may be placed. An abradable material 101 is placed on the stationary shroud, ring or casing 103 opposite rotating blade 105 tips 107 to reduce clearances with minimum risk to the turbine components during blade-to-housing rubs. The seals 101 are worn-in by the rotating blade during service with little wear of the blade tips. The seals reduce operating clearances by allowing tighter cold-build clearances without fear of damaging blade tips by tip/shroud closures during turbine transients and at steady state. Additionally, applying an abradable material further reduces effective clearances for often encountered casing out of roundness and rotor lateral movement.

Abradable seal development is materials centered. The material types are typically classified according to their temperature capability. For use temperatures above 760° C. (1,400° F.), porous ceramics are generally used as the abradable material. The most widely used material is a yttria-stabilized zirconia (YSZ). A fugitive polymeric phase is usually added to produce the desired level of porosity. To prevent blade tip wear, a cutting element may be added to the blade tips.

The coating microstructure and porosity are also important for abradability. The more porous the coating is, the higher its abradability but the lower its erosion resistance.

Shown in FIG. 2 is an example of a typical, metallic abradable seal 201. The abradable seal is segmented, made from a number of seal segments 203 where each seal segment 203 is coupled to an inner surface 205 of a turbine blade shroud segment 207. The abradable seal segments 203 are brazed to each shroud segment 207. The seal/shroud segments 209 are coupled together forming a complete shroud 301 having an abradable seal 303 around its inner periphery as shown in FIG. 3. This method of abradable seal construction is compromised in sealing efficiency due to the individual seal segments and difficulty of repair due to brazing.

Cold spray deposition is an emerging technology where solid powder particles at or near room temperature are accelerated to velocities in the range of 500 to 1,500 m/sec in a supersonic gas jet. Upon impact with a work piece surface, these high-velocity cold particles plastically deform and bond with the underlying material by a process similar to explosive welding, but on a much smaller scale. Cold spray deposition can be used to deposit a wide range of metals and other ductile materials at high production rates.

The cold spray process offers many advantages over other metallization processes. Since the powders are not heated to high temperatures, no oxidation, decomposition, or other degradation of the feedstock material occurs. Because the process occurs essentially at room temperature, copper, aluminum, and many other reactive metals can be cold sprayed in an open-air environment with little or no oxidation.

Powder oxidation during deposition is also controlled since the particles are contained within the accelerating gas stream. Other potential advantages include the formation of compressive residual surface stresses and retaining the microstructure of the feedstock. Also, because relatively low temperatures are used, thermal distortion of the substrate will be minimized. Because the feedstock is not melted, cold spray offers the ability to deposit materials that cannot be sprayed conventionally due to the formation of brittle intermetallics or a propensity to crack upon cooling or during subsequent heat treatments.

Abradable material porosity may be controlled by varying the cold spray process parameters. These parameters include composition of the carrier and main gas, spray nozzle travel speed, powder feed rate, main gas temperature and pressure, nozzle spray distance, and powder composition.

It is a challenge to form high performance abradable seals while controlling the porosity of the seal material. It is therefore desirable to have a method that allows for the precise application of abradable seal material to seal backing materials to form air seals that increase efficiency and performance.

SUMMARY OF THE INVENTION

Although there are various methods for forming abradable seals, such methods are not completely satisfactory. The inventors have recognized that it would be desirable to have methods that apply abradable material to seal backing materials using cold spray deposition technology to control the seal porosity and thickness.

One aspect of the invention provides methods for applying an abradable material onto a seal backing surface. Methods according to this aspect of the invention preferably start with dimensioning a seal area on the seal backing material surface, selecting at least one abradable material for the seal area, deriving a nozzle path across the seal area, deriving a spray distance for the nozzle path, and depositing at least one abradable material from the nozzle onto the seal backing material surface so that the abradable material plastically deforms without melting and bonds to the backing material upon impact with the surface.

Another aspect of the method is where different abradable materials are deposited in different areas of the seal area.

Yet another aspect of the method is where the travel speed varies throughout the nozzle path.

The details of one or more embodiments of the invention are set forth in the accompanying drawings and the description below. Other features, objects, and advantages of the invention will be apparent from the description and drawings, and from the claims.

DETAILED DESCRIPTION

Embodiments of the invention will be described with reference to the accompanying drawing figures wherein like numbers represent like elements throughout. Further, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. The terms "mounted," "connected," and "coupled" are used broadly and encompass both direct and indirect mounting, connecting, and coupling. Further, "connected" and "coupled" are not restricted to physical or mechanical connections or couplings.

Embodiments of the invention provide methods using cold spray deposition technology to deposit abradable material directly onto a seal backing material to form an abradable seal. The invention allows for the application of abradable materials to a flat or contoured seal backing material surface to form air seals having uniform or varied thicknesses. Depending on the application, the thickness and porosity of the applied abradable seal material may vary in the seal area depending on the rotating/stationary interference.

The invention can use any deposition process that provides sufficient energy to accelerate particles to a high enough velocity such that, upon impact, the particles plastically deform and bond to a surface, building a coating or deposit. The deposition process does not metallurgically transform the particles from their solid state.

The particles plastically deform and bond onto a surface such as a seal backing material, or onto a previously deposited abradable seal material surface. The process allows for controlling the porosity of the abradable material that is being deposited. For example, multiple layers in predetermined areas may add thickness to account for identified interface variances between the rotating and stationary components and depositing different abradable materials for each layer may control density and porosity as the layers grow from the seal backing material.

Various techniques to achieve this type of particle deposition have been evaluated and reduced to practice such as cold gas dynamic spraying (cold spray deposition), kinetic metallization, electromagnetic particle acceleration, modified high velocity air fuel spraying, or high velocity impact fusion (HVIF). These are examples of high velocity deposition processes where metallurgical transformation of powder metal particles is not encountered. Preferably, the invention uses the cold spray deposition process. However, the invention may use other cold deposition processes.

Figure 4:
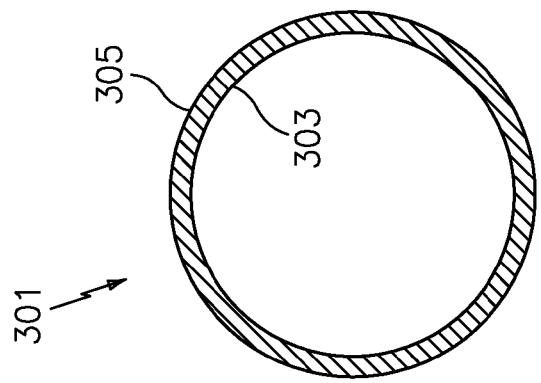
FIG. 4 is an exemplary section-view of a single-piece seal backing segment.

As an example, shown in FIG. 4 is a cross-sectional representation of a turbine shroud 301. The turbine shroud 301 may be comprised of a plurality of segments, or may be a unitary structure. The shroud has inner 303 and outer 305 surfaces.

Figure 7:
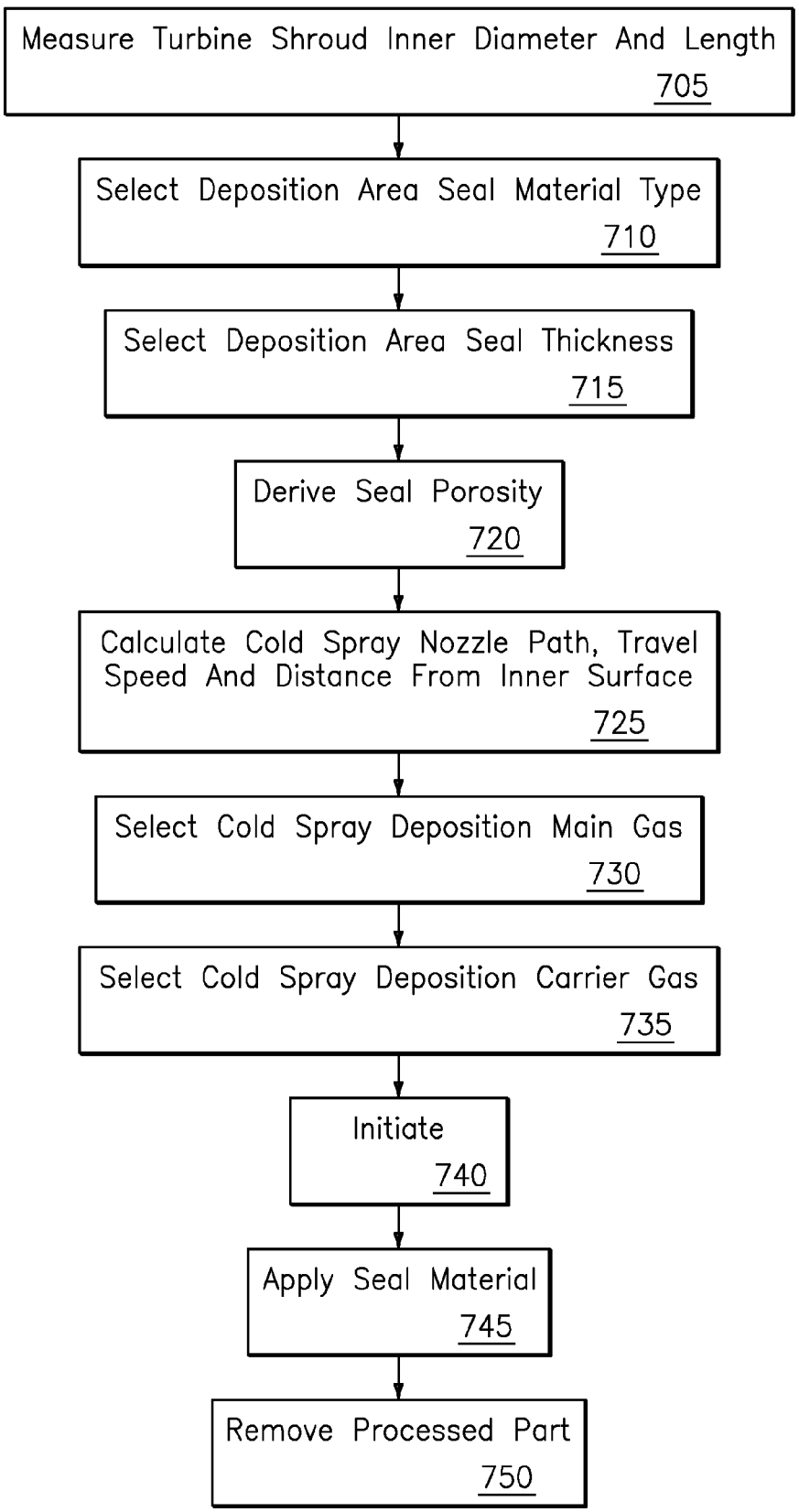
FIG. 7 is a block diagram of an exemplary method according to the invention.

FIG. 7 shows a method of the invention. The method uses cold spray deposition to apply an abradable material onto a seal backing material. The method measures the surface where the abradable material is to be applied (step 705) for determining a nozzle path from the seal backing material surface. The nozzle spray distance is not determined by the deposit thickness. Preferably, the nozzle spray distance is approximately 1 inch. For example, if a 2 inch thick deposit is required, the nozzle begins at a starting distance of 1 inch. As the abradable material is deposited, the nozzle distance is maintained from the surface of the deposited abradable material, not the original seal backing material surface. In this manner, the same distance is maintained regardless of the deposited seal thickness. The deposition process is insensitive to small variations in nozzle spray distance. For some deposits of less than a predetermined thickness, such as 0.2 inch, the nozzle spray distance may not require adjusting as deposition progresses.

An abradable material is chosen (step 710) for the seal application. The material choice may depend on operating temperature and rotating part speed. The abradable seal material and rotating part speed must be designed to suit the particular application as a tribological system. Abradable materials consisting of various Ti alloys, various Ni alloys, plus others may be used. Any material that can be successfully applied using the cold spray process may be used. A porosity is derived (step 715) depending on the spray parameters.

Based upon the abradable material and desired porosity, the method derives a path for the nozzle to negotiate when applying the abradable material, a nozzle speed, and a distance the nozzle must be from the seal backing material in a given area (step 725). The travel speed and distance from the surface may vary according to the thickness and porosity desired at certain areas. A main gas (step 730) and a carrier gas (step 735) are chosen.

For situations where the ideal abradable material may bond poorly with a seal backing material, spraying a material that bonds well with the seal backing material and to the desired abradable material may be used as an intermediate layer (bond coat). Varying the porosity of the abradable material may be achieved with thickness, having a denser region near the seal backing material for added rigidity, with increasing porosity towards the sealing surface.

Figure 5:
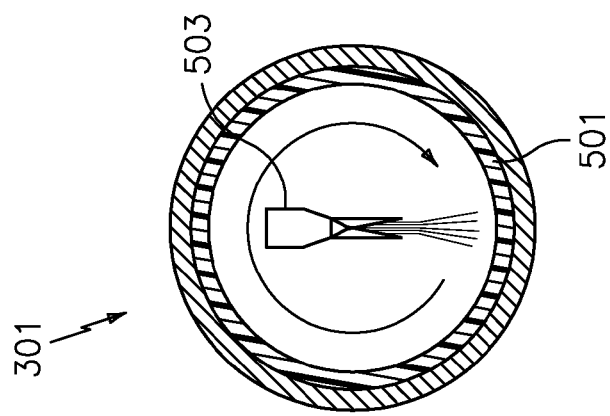
FIG. 5 is an exemplary section-view of the seal backing segment shown in FIG. 4 having an abradable material applied using cold spray deposition technology.

Shown in FIG. 5 is a deposition of an abradable seal material 501 onto the inner surface 303 of the shroud 301 using cold spray deposition. The cold spray deposition system includes a spray gun having a converging/diverging nozzle 503 through which the abradable material is sprayed onto a seal backing material surface 303.

The seal backing material (shroud 301) may be placed in an appropriate fixture, if required, and the abradable material deposited. In some instances it may be desirable to hold the seal backing material stationary and manipulate the spray nozzle. In others, the spray nozzle may be stationary and the seal backing material manipulated either by hand or deposition system robotic control. In some situations, both the part and the nozzle may be manipulated. In a preferred embodiment, the cold spray nozzle 503 is positioned within the seal backing material whereupon the spray is initiated (step 730).

In the method of the invention, the abradable material feedstock is a powdered metal material. The abradable seal material is typically softer than the rotating/mating component in order for wear to occur in the seal. The mating material is typically known prior to choosing the abradable seal material.

The powdered metal material particles that are used to form the abradable seal on the surface 303 preferably have a diameter in the range of about 5 microns to 50 microns (0.2-2.0 mils). Smaller particle sizes allow for higher particle velocities. Below 5 microns in diameter, the particles risk getting swept away from the surface 303 due to a bow shock layer above the surface 303, i.e., insufficient mass to propel the particle through the bow shock. The narrower the particle size distribution, the more uniform the particle velocity will be. This is because the small particles in the spray/plume will hit the slower, larger ones and effectively reduce the velocity of both.

The particles of the abradable material may be accelerated to supersonic velocities using compressed gas, such as helium, nitrogen, other inert gases, and mixtures thereof. Helium produces a high velocity due to its low molecular weight which may yield a denser deposition while nitrogen produces a lower velocity which may produce a less dense deposition given the same operational parameters.

The bonding mechanism employed by the method of the invention for transforming the powdered abradable material into a deposit is solid state, meaning that the particles plastically deform but do not melt. Any oxide layer that is formed on the particles, or is present on the component surface, is broken up and fresh metal-to-metal contact is made at very high pressures.

The powdered metal material used to form the abradable seal may be fed to the spray gun using any suitable means known in the art, such as modified thermal spray feeders. Fluidized bed feeders and barrel roll feeders with an angular slit may also be used.

In the method of the invention, the feeders may be pressurized with a gas selected from the group consisting of helium, nitrogen, other inert gases, and mixtures thereof. Feeder pressures are generally 15 psi above the main gas or head pressures, which pressures are usually in the range of from 200 psi to 500 psi, depending on the abradable material composition.

The main gas is heated so that gas temperatures are in the range of from 600° F. to 1,200° F. If desired, the main gas may be heated as high as approximately 1,250° F. depending on the material being deposited. The gas may be heated to keep it from rapidly cooling and freezing once it expands past the throat of nozzle 503. The net effect is a deposition surface temperature of 100° F. to 200° F., depending on the area and thickness of the deposited material. Any suitable means known in the art may be used to heat the gas.

To deposit the abradable material, the nozzle 503 may pass over the surface 303 of the part 301 more than once. The number of passes required is a function of the desired seal thickness, powder feed rate, and relative nozzle to work piece speed. The method is capable of forming a deposit having any desired thickness typically used for turbine seals. When applying a seal, it is desirable to limit the thickness per pass in order to avoid a quick build up of residual stresses and unwanted debonding between deposit layers.

The main gas that is used to deposit the abradable material particles onto the surface 24 may be passed through the nozzle 503 at a flow rate of from 0.001 SCFM to 50 SCFM, preferably in the range of from 15 SCFM to 35 SCFM. The foregoing flow rates are preferred if helium is used as the main gas. If nitrogen is used by itself or in combination with helium as the main gas, the nitrogen gas may be passed through the nozzle 503 at a flow rate of from 0.001 SCFM to 30 SCFM, preferably from 4 to 30 SCFM. Alternatively, the nozzle 503 may have a single inlet which is connected to a valve for switching between two gases (step 730).

The main gas temperature may be in the range of from 600° F. to 1,200° F., preferably from 700° F. to 1,000° F., and most preferably from 725° F. to 900° F.

The pressure of the spray gun may be in the range of from 200 psi to 500 psi, preferably from 200 psi to 400 psi and most preferably 275 psi to 375 psi. The abradable material particles are fed from a hopper, which is under a pressure of 10 to 50 psi higher than the specific main gas pressure, preferably 15 psi higher, to the spray gun via line at a rate in the range of from 10 grams/min to 100 grams/min, preferably from 15 grams/min to 50 grams/min.

The abradable material is fed to the spray gun using a non-oxidizing carrier gas. The carrier gas may be introduced at a flow rate of from 0.001 SCFM to 50 SCFM, preferably from 8 SCFM to 15 SCFM. The foregoing flow rate is useful if helium is used as the carrier gas. If nitrogen by itself or mixed with helium is used as the carrier gas, a flow rate of from 0.001 SCFM to 30 SCFM, preferably from 4 to 10 SCFM, may be used (step 735).

The nozzle 503 is set at a predetermined spray distance from the seal backing material surface 303 depending on the deposit thickness at a particular seal area. The spray distance is in the range of from 10 mm to 50 mm, typically at 25 mm.

The velocity of the abradable material particles leaving the spray nozzle 503 depend on all of the above described operational parameters and that the parameters needed depend on the critical velocity requirement of the powder being sprayed.

Figure 1:
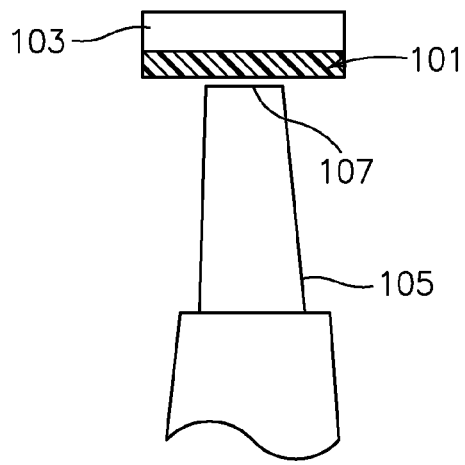
FIG. 1 is an exemplary side-view of abradable material for blade-tip sealing.
Figure 2:
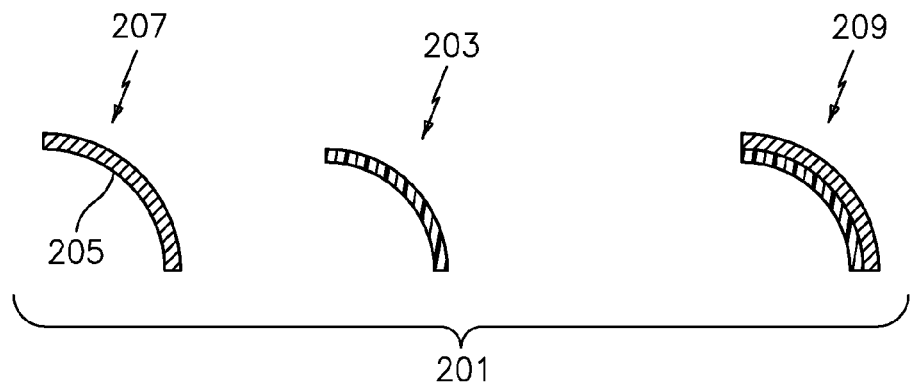
FIG. 2 is an exemplary section-view of a seal backing material segment with abradable seal.
Figure 3:
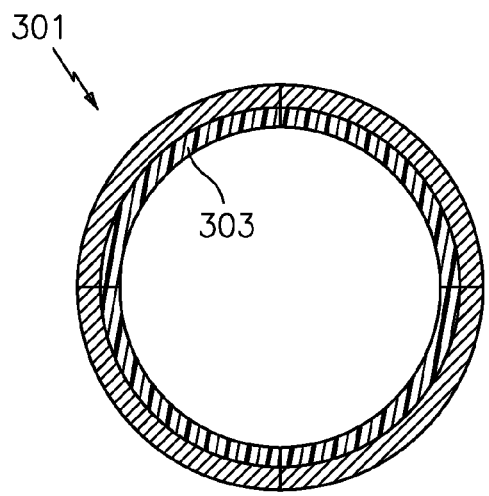
FIG. 3 is an exemplary section-view of the seal backing segments with abradable seal shown in FIG. 2 assembled.
Figure 6:
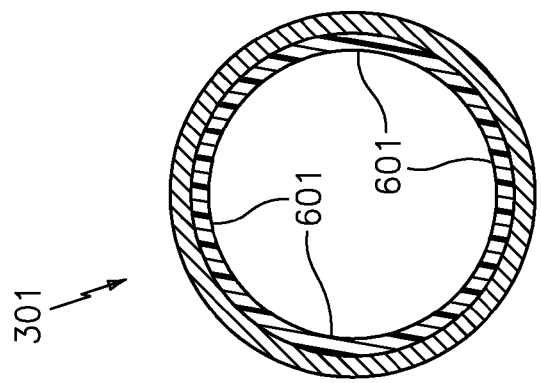
FIG. 6 is an exemplary section-view of the seal backing material shown in FIG. 4 with abradable material in place.

The nozzle 503 travels the predetermined path. The cold spray deposition control system (not shown) provides for programming a predetermined path, travel speed and spray distance (step 740). As described above, one or more parameter may vary. The nozzle 503 may perform a 360° coating pass, for example, at one axial position, then index to another axial position and perform another 360° coating pass. A series of overlapping abradable material rings is deposited. The size of the axial step is set to allow enough overlap for complete coverage without making a peak or valley in the deposited abradable material where the overlaps occur. The step size is a process parameter (step 745). A finished, abradable sealing surface 601 applied according to the invention is shown in FIG. 6 (step 750).

Other path variants allow for multiple passes for thicker sealing surfaces, or spraying within a predetermined area of the inner shroud surface.

Figure 8:
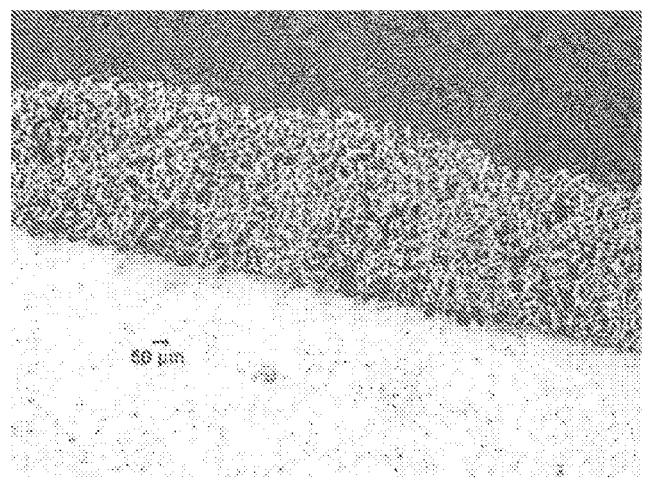
FIG. 8 is a photomicrograph of an abradable seal comprised of an abradable porous metal Ti 6-4 applied to a titanium 6-4 backing material.
Figure 9:
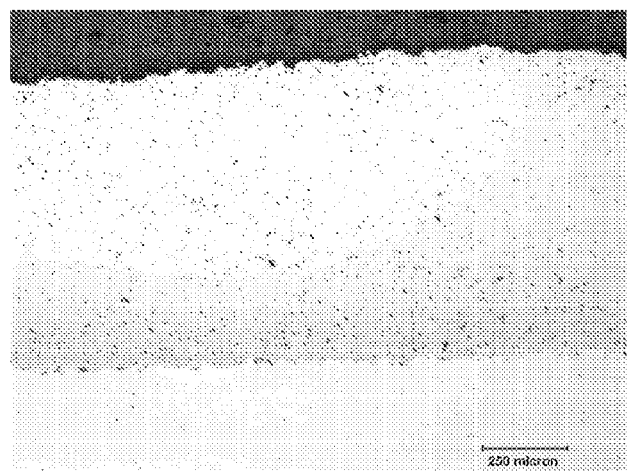
FIG. 9 is a photomicrograph of an abradable seal comprised of an abradable porous metal IN625 applied to an Inconel 718 backing material.
Figure 10:
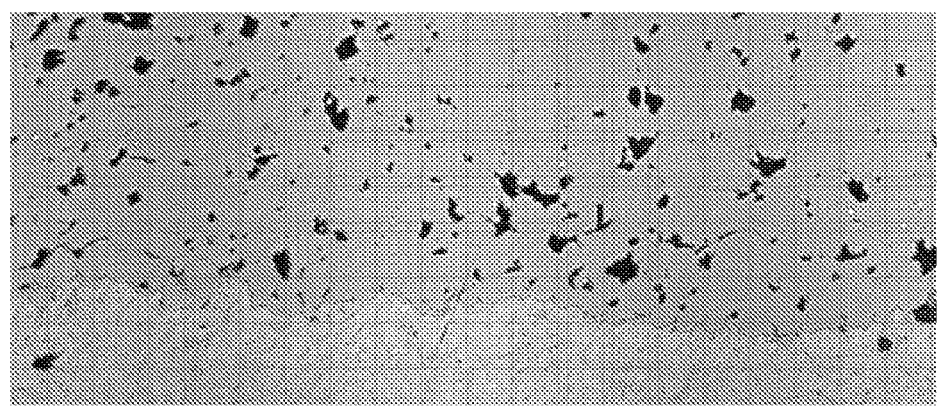
FIG. 10 is a photomicrograph of an abradable seal comprised of an abradable porous metal IN718 applied to an Inconel 718 backing material.

Examples of abradable seal materials deposited on to seal backing materials in accordance with the invention are shown in FIGS. 8, 9 and 10. FIG. 8 shows an abradable seal comprised of a porous metal Ti 6-4 applied to a Ti 6-4 backing material, FIG. 9 shows an abradable seal comprised of a porous metal IN625 applied to an Inconel 718 backing material, and FIG. 10 shows an abradable seal comprised of a porous metal IN718 applied to an Inconel 718 backing material.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. A method of applying an abradable material onto a seal backing material surface comprising:
   measuring a seal area on the seal backing material surface;

selecting at least one abradable material for the seal area;

deriving a nozzle path from a surface of said seal backing material across said seal area;

said deriving step comprising deriving said nozzle path as a function of the selected at least one abradable material and a desired porosity;

deriving a spray distance for a spray nozzle along said nozzle path so as to maintain said spray nozzle at a constant distance from a surface of the deposited at least one abradable material and not from the surface of said seal backing material; and depositing said at least one abradable material from said spray nozzle onto said seal backing material surface so that said at least one abradable material plastically deforms without melting and bond to said seal backing material surface upon impact with said surface.

2. The method according to claim 1 wherein said spray distance is not more than 50 mm.

3. The method according to claim 1 wherein said spray distance is in the range of from 10 mm to 50 mm.

4. The method according to claim 1 further comprising deriving a travel speed for said nozzle path.

5. The method according to claim 4 wherein said travel speed varies throughout said nozzle path.

6. The method according to claim 5 further comprising selecting at least one seal thickness on said seal area.

7. The method according to claim 6 wherein different abradable materials are deposited in different areas of said seal area.

8. The method according to claim 7 wherein said depositing comprises providing said abradable material in particle form having a particle size no greater than 50 microns.

9. The method according to claim 7 wherein said depositing comprises providing said abradable material in particle form having a particle size in the range of from 5 to 50 microns.

10. The method according to claim 1 further comprising selecting a carrier gas from the group consisting of helium, nitrogen, another inert gas, and mixtures thereof.

11. The method according to claim 10 wherein said depositing comprises accelerating said particles to a speed in the range of from 825 m/s to 1400 m/s.

12. The method according to claim 11 wherein said depositing further comprises feeding said at least one abradable material to said spray nozzle at a feed rate of from 10 grams/min to 100 grams/min using said selected carrier gas.

13. The method according to claim 12 wherein said feeding comprises feeding said at least one abradable material to said spray nozzle at a feed rate of from 10 grams/min to 50 grams/min.

14. The method according to claim 13 wherein said carrier gas is helium and said feeding comprises feeding helium to said nozzle at a flow rate of from 0.001 SCFM to 50 SCFM.

15. The method according to claim 14 wherein said feeding comprises feeding said helium to said nozzle at a flow rate in the range of from 8.0 SCFM to 15 SCFM.

16. The method according to claim 13 wherein said carrier gas is nitrogen and said feeding comprises feeding said nitrogen to said nozzle at a flow rate of from 0.001 SCFM to 30 SCFM.

17. The method according to claim 16 wherein said feeding comprises feeding said nitrogen to said nozzle at a flow rate of from 4.0 SCFM to 10 SCFM.

18. The method according to claim 13 wherein said depositing comprises passing said abradable material particles through said nozzle using a main gas selected from the group consisting of helium, nitrogen, another inert gas, and mixtures thereof at a main gas temperature in the range of from 600 degrees Fahrenheit to 1200 degrees Fahrenheit and at a spray pressure in the range of from 200 psi to 500 psi.

19. The method according to claim 18 wherein said passing comprises passing said abradable material particles through said nozzle at a main gas temperature in the range of from 700 degrees Fahrenheit to 1000 degrees Fahrenheit at a spray pressure in the range of from 200 psi to 400 psi.

20. The method according to claim 18 wherein said main gas temperature is in the range of from 725 degrees Fahrenheit to 900 degrees Fahrenheit at a spray pressure in the range of from 275 psi to 375 psi.

21. The method according to claim 18 wherein said main gas comprises helium and said passing comprises feeding said helium to said nozzle at a flow rate in the range of from 0.001 SCFM to 50 SCFM.

22. The method according to claim 21 wherein said helium feeding comprises feeding said helium to said nozzle at a flow rate in the range of from 15 SCFM to 35 SCFM.

23. The method according to claim 18 wherein said main gas comprises nitrogen and said passing comprises feeding said nitrogen to said nozzle at a feed rate in the range of from 0.001 SCFM to 30 SCFM.

24. The method according to claim 23 wherein said nitrogen feeding comprises feeding said nitrogen to said nozzle at a feed rate in the range of from 4.0 to 8.0 SCFM.

25. The method according to claim 10 wherein said depositing comprises accelerating said particles to a speed in the range of from 850 m/s to 1200 m/s.

26. The method according to claim 1, wherein said depositing step comprises depositing an abradable material selected from the group of a porous titanium alloy and a nickel based alloy onto a backing material.

27. The method according to claim 26, wherein said depositing step comprises depositing a metal Ti 6-4 material onto a backing material formed from a Ti 6-4 material.

* * * * *